(12) United States Patent
Leather et al.

(10) Patent No.: US 7,796,133 B1
(45) Date of Patent: Sep. 14, 2010

(54) UNIFIED SHADER

(75) Inventors: Mark M. Leather, Saratoga, CA (US); Eric Demers, Palo Alto, CA (US)

(73) Assignee: ATI Technologies ULC, Markham, Ontario (CA)

( * ) Notice: Subject to any disclaimer, the term of this patent is extended or adjusted under 35 U.S.C. 154(b) by 0 days.

(21) Appl. No.: 10/730,965

(22) Filed: Dec. 8, 2003

Related U.S. Application Data

(63) Continuation of application No. 10/716,946, filed on Nov. 18, 2003, now abandoned.

(60) Provisional application No. 60/427,338, filed on Nov. 18, 2002.

(51) Int. Cl.
G06T 15/50 (2006.01)
G06T 11/40 (2006.01)
G09G 5/00 (2006.01)
G09G 5/02 (2006.01)

(52) U.S. Cl. ........................ 345/426; 345/582; 345/552; 345/589

(58) Field of Classification Search ......... 345/501–503, 345/581, 584, 426, 428, 505, 506, 531, 582, 345/589, 558, 559, 530, 536, 545
See application file for complete search history.

(56) References Cited

U.S. PATENT DOCUMENTS

| | | | |
|---|---|---|---|
| 4,885,703 A | 12/1989 | Deering | |
| 5,179,640 A | 1/1993 | Duffy | |
| 5,550,962 A | 8/1996 | Nakamura et al. | |
| 5,745,118 A | 4/1998 | Alcorn et al. | |
| 5,794,016 A | 8/1998 | Kelleher | |
| 5,818,469 A | 10/1998 | Lawless et al. | |
| 5,905,506 A | 5/1999 | Hamburg | |
| 5,977,997 A | 11/1999 | Vainsencher | |
| 5,999,196 A * | 12/1999 | Storm et al. | 345/506 |
| 6,118,452 A | 9/2000 | Gannett | |
| 6,184,906 B1 | 2/2001 | Wang et al. | |
| 6,219,062 B1 | 4/2001 | Matsuo et al. | |
| 6,222,550 B1 | 4/2001 | Rosman et al. | |

(Continued)

OTHER PUBLICATIONS

Breternitz, Jr., Mauricio et al.; Compilation, Architectural Support, and Evaluation of SIMD Graphics Pipeline Programs on a General-Purpose CPU; IEEE; 2003; pp. 1-11.

(Continued)

*Primary Examiner*—Hau H Nguyen
(74) *Attorney, Agent, or Firm*—Vedder Price P.C.

(57) ABSTRACT

The present invention is a unified shader unit used in texture processing in graphics processing device. Unlike the conventional method of using one shader for texture coordinate shading and another for color shading, the present shader performs both operations. The unified shader uses the same precision for both texture coordinate and color shading, thus simplifying the complexity of programming for two separate conventional shaders with different levels of precision. Furthermore, the present invention uses enhanced scheduling logic to perform indirect texture and bump mapping in a single first-in, first-out (FIFO) memory structure and avoids the problems associated with large FIFOs with buffer registers found in conventional shaders. In one embodiment, a plurality of ALU-memory pairs are synchronized to form a plurality of pipelines to execution shading instructions. In another embodiment, a plurality of unified shaders are synchronized and connected together to processing shading operations concurrently.

43 Claims, 8 Drawing Sheets

U.S. PATENT DOCUMENTS

| | | | |
|---|---|---|---|
| 6,292,200 | B1 | 9/2001 | Bowen et al. |
| 6,323,860 | B1 | 11/2001 | Zhu et al. |
| 6,344,852 | B1 | 2/2002 | Zhu et al. |
| 6,353,439 | B1 | 3/2002 | Lindholm et al. |
| 6,380,935 | B1 | 4/2002 | Heeschen et al. |
| 6,384,824 | B1 * | 5/2002 | Morgan et al. ............. 345/426 |
| 6,407,736 | B1 | 6/2002 | Regan |
| 6,417,858 | B1 | 7/2002 | Bosch et al. |
| 6,424,345 | B1 | 7/2002 | Smith et al. |
| 6,557,083 | B1 | 4/2003 | Sperber et al. |
| 6,570,579 | B1 | 5/2003 | MacInnis et al. |
| 6,573,893 | B1 | 6/2003 | Naqvi et al. |
| 6,636,232 | B2 | 10/2003 | Larson |
| 6,650,327 | B1 | 11/2003 | Airey et al. |
| 6,650,330 | B2 | 11/2003 | Lindholm et al. |
| 6,697,063 | B1 | 2/2004 | Zhu |
| 6,714,203 | B1 | 3/2004 | Morgan et al. |
| 6,724,394 | B1 * | 4/2004 | Zatz et al. ................ 345/581 |
| 6,731,289 | B1 | 5/2004 | Peercy et al. |
| 6,750,867 | B1 | 6/2004 | Gibson |
| 6,753,878 | B1 | 6/2004 | Heirich et al. |
| 6,762,763 | B1 | 7/2004 | Migdal et al. |
| 6,778,177 | B1 | 8/2004 | Furtner |
| 6,791,559 | B2 | 9/2004 | Baldwin |
| 6,801,203 | B1 | 10/2004 | Hussain |
| 6,809,732 | B2 | 10/2004 | Zatz et al. |
| 6,864,893 | B2 * | 3/2005 | Zatz ........................ 345/503 |
| 6,864,896 | B2 | 3/2005 | Perego |
| 6,897,871 | B1 | 5/2005 | Morein et al. |
| 6,980,209 | B1 * | 12/2005 | Donham et al. ............. 345/426 |
| 7,015,913 | B1 | 3/2006 | Lindholm et al. |
| 7,061,495 | B1 | 6/2006 | Leather |
| 7,170,515 | B1 | 1/2007 | Zhu |
| 2002/0145612 | A1 | 10/2002 | Blythe et al. |
| 2003/0076320 | A1 * | 4/2003 | Collodi ..................... 345/426 |
| 2003/0164830 | A1 | 9/2003 | Kent |
| 2004/0041814 | A1 | 3/2004 | Wyatt et al. |
| 2004/0100471 | A1 | 5/2004 | Leather et al. |
| 2004/0164987 | A1 | 8/2004 | Aronson et al. |
| 2005/0068325 | A1 | 3/2005 | Lefebvre et al. |
| 2005/0200629 | A1 | 9/2005 | Morein et al. |
| 2006/0170690 | A1 | 8/2006 | Leather |

OTHER PUBLICATIONS

International Search Report for PCT Patent Application PCT/IB2004/003821 dated Mar. 22, 2005.

Elias, Hugo; "Polygon Scan Converting"; from http://freespace/virgin.net/hugo.elias/graphics/x_polysc.htm; dated Jul. 26, 2005; pp. 1-7.

European Search Report from European Patent Office; European Application No. 03257464.2; dated Jan. 4, 2006.

Foley, James et al.; Computer Graphics, Principles and Practice; Addison-Wesley Publishing Company; 1990; pp. 873-899.

Crockett, Thomas W.; An introduction to parallel rendering; Elsevier Science B.V.; 1997; pp. 819-843.

Montrym, John S. et al.; InfiniteReality: A Real-Time Graphics System; Silicon Graphics Computer Systems; 1997; pp. 293-302.

Humphreys, Greg et al.; WireGL: A Scalable Grpahics System for Clusters; ACM Siggraph; Aug. 2001; pp. 129-140.

Akeley K. et al., "High-Performance Polygon Rendering", ACM Computer Graphics vol. 22 No. 4; Aug. 1988, pp. 239-246.

Fuchs, Henry et al., "Pixel-Planes 5: A Heterogeneous Multiprocessor Graphics System Using Processor-Enhanced Memories"; Computer Graphics, vol. 23, No. 3, Jul. 1989; pp. 79-88.

* cited by examiner

UNIFIED SHADER

RELATED APPLICATION

This application is a continuation of U.S. application Ser. No. 10/716,946, filed Nov. 18, 2003, now abandoned which claims priority from U.S. provisional application No. 60/427,338, filed Nov. 18, 2002.

BACKGROUND OF THE INVENTION

1. Field of the Invention

The present invention relates computer graphics. More specifically, one or more embodiments of the present invention relate to a unified shader.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

Computer systems are often used to generate and display graphics on an output device such as a monitor. Display images are made up of thousands of tiny dots, where each dot is one of thousands or millions of colors. These dots are known as picture elements, or "pixels". Each pixel has multiple attributes associated with it, including a color and a texture. A shader is used to perform arithmetic and logical operations on all of the attributes of the pixel to achieve one value that is used when the pixel is output. Typically graphics systems use separate shaders for texture and color. Separate shaders make their use difficult and expensive. This problem can be understood by reviewing the way that graphics systems process data.

Each pixel has a color, with the color of each pixel being represented by a number value stored in the computer system. A three dimensional display image, although displayed using a two dimensional array of pixels, may in fact be created by rendering of a plurality of graphical objects. Examples of graphical objects include points, lines, polygons, and three dimensional solid objects. Points, lines, and polygons represent rendering "primitives" which are the basis for most rendering instructions. More complex structures, such as three dimensional objects, are formed from a combination or mesh of such primitives. To display a particular scene, the visible primitives associated with the scene are drawn individually by determining those pixels that fall within the edges of the primitive, and obtaining the attributes of the primitive that correspond to each of those pixels. The obtained attributes are used to determine the displayed color values of applicable pixels.

Sometimes, a three dimensional display image is formed from overlapping primitives or surfaces. A blending function based on an opacity value associated with each pixel of each primitive is used to blend the colors of overlapping surfaces or layers when the top surface is not completely opaque. The final displayed color of an individual pixel may thus be a blend of colors from multiple surfaces or layers.

In some cases, graphical data is rendered by executing instructions from an application that is drawing data to a display. During image rendering, three dimensional data is processed into a two dimensional image suitable for display. The three dimensional image data represents attributes such as color, opacity, texture, depth, and perspective information. The draw commands from a program drawing to the display may include, for example, X and Y coordinates for the vertices of the primitive, as well as some attribute parameters for the primitive (color and depth or "Z" data), and a drawing command. The execution of drawing commands to generate a display image is known as graphics processing.

Shaders

A shader performs the processing in the graphics pipeline for each pixel. Namely, a shader performs all of the arithmetic and logical operations on all of the attributes of the pixel to combine them and generate a single color value. The single attribute value is placed in a computer's frame buffer and is used when the pixel is output to a display device. Typically graphics systems divide shaders into a texture address unit and a pixel shader. A texture address unit handles texture address calculations. A pixel shader handles color value calculations.

Historically, two types of categories fall into the shader. A first category is the processing of color, which may include processing Z, all of the source attributes having come from interpolation across primitives or a texturing operation. A second category is the operations performed on the texture coordinates themselves. Some prior systems that operate on texture coordinates place all textures into a single pipeline or process multiple texture images in parallel across multiple pipelines. One scheme with a single pipeline uses indirect texturing. Indirect texturing performs texture operations on a pixel (or a number of pixels in parallel) and then uses the texture value to alter the texture coordinates of the pixel if necessary.

Indirect Texturing

Indirect texturing may be used to perform bump mapping, among other things. Bump mapping uses a first texture image with a first set of texture coordinates and a second texture image with a second set of texture coordinates. The first texture image represents a displacement (or bumpiness) that when combined with the texture coordinates of the second texture image displace the texture coordinates which are then sent back through the pipeline. This produces a textured surface that is not totally a smooth light surface, but rather a more textured, bumpy surface, which is more realistic. Another scheme uses a loopback facility to pass the output of the pipeline back to the input of the pipeline to enhance bump mapping operations.

Still, however, conventional shaders are separated into two classes which perform different shading computations. Shading computations performed on colors are typically low precision, 8 bits for instance. Shading computations performed on texture coordinates are typically of higher precision and range because they are addresses into images and must address the image at a sub-texel resolution. So, typically there is a 12 bit number needed for the coordinate of the texture address plus additional bits, three or four for instance, to identify the sub-texel sample location to avoid aliasing effects. Moreover, these bits require an even higher number of bits to achieve accuracy in the range of 15 to 16 bits. Thus, substantially higher precision is needed in a texture coordinate configured shader than in a color shader (twice the precision or more is typical).

For these reasons, color shaders are used for general applications of color while texture coordinate shaders have been limited to only performing high precision bump mapping displacement algorithms. Due to the differing number of bit precisions for the two shaders, each shader uses its own instruction sets, which constrains the generality, flexibility, and overall usefulness of shading algorithms. Moreover, the underlying drivers and computer hardware involved in shading must know whether it is dealing with a color or a texture coordinate, which is disadvantageous.

Another problem associated with multiple, limited shaders is in the structures that must be implemented to perform the shading necessary to render an image. In particular, displacement mapping requires very large structures to hold pixels that are to be operated upon. These structures typically service the pixels in a first-in, first-out manner (FIFO). The FIFOs using bump mapping become huge and inefficient and a large buffer must also be used to store the interpolated results that are to be operated on. The buffer is typically a register and there is a cost associated with synchronizing data between a separate FIFO and register.

SUMMARY OF THE INVENTION

The present invention relates to a unified shader. According to one or more embodiments, the functions of a color shader and a texture coordinate shader are combined into a single, unified shader. The unified shader performs both color shading and texture coordinate shading. The unified shader takes a relatively high numerical precision like a texture coordinate shader, but uses the same precision for color shading. The conventional distinction between shading operations (i.e., color texture map and coordinate texture map or color shading operation and texture coordinate operation) is not handled by the use of separate shaders. In the present invention, such distinction is only the intent of the application and the application program interface (API). In this way, any operation, be it for color shading or texture shading, may loop back into the shader and be combined with any other operation.

In one embodiment, color operations are made to a higher precision so that they are the same precision as the texture shading operations. To accomplish this, enhanced scheduling and pipelining of the shading operations are used. In one embodiment, a pipeline in the shader is created for both texture operations and color operations. In the pipelines, a plurality of ALU/SRAM pairs are used to process the shading operations. These ALU/SRAM pairs are synchronized by an internal clock to ensure proper read/write sequences and execution correctness. A scheduled order for texture and color operations is determined and a scheduler is used with both pipelines. The scheduler is used to time the operations correctly, for instance if a texture operation precedes a color operation in a given sequence, then the scheduler will cause the unified shader to wait for input on the color operation pipeline until the texture pipeline completes its operations.

In prior art systems, indirect texture and bump mapping would have required large FIFO memory structures. The unified shader in the present invention handles such mapping without the huge FIFOs and buffer register needed in a conventional texture shader. Instead, the internal clock scheduling mechanism and architecture ALU/SRAM pairs of the unified shader enable it to use only a single memory structure, which may be a FIFO. The FIFO in one embodiment may be placed in SRAM, which is speedier and more efficient than the conventional method of using a FIFO combined with a buffer. Also, because the buffer register is not needed in the FIFO of the unified shader, the cost associated with synchronizing between a buffer register and a FIFO is removed. All these factors result in the reduction in size of the FIFO used in the unified shader. Moreover, in the present invention, the data and operations that are needed to perform shading may be pipelined through the same FIFO. Though SRAM is used in one embodiment, it can be appreciated that other types of equivalent physical memory implementation can be used as well.

In one embodiment, incoming shader codes are partitioned according level of indirection to ensure all ALU and texture instructions pertaining to a given level of indirection are grouped together. The reason for this is that texture operations within the same level are effectively executed in parallel, and so it is important that there be no cross-dependencies. In one embodiment, indirection levels are numbered starting with 0 at the top of the code, and increasing by 1 for each pass through the texture system. An indirection level of 0 means that all ALU operands or texture addresses are derived directly from the input data (rasterized color and texture addresses). Each subsequent level assignment corresponds to the dependency on the number of passes through the texture system (i.e. level N means that all ALU operands or texture addresses are dependent on the result from N pass(es) through the texture system). Control logic within the unified shader uses a plurality of state machines connected serially by a set of small FIFO's to ensure codes separated by levels are executed in the proper sequence.

A register subsystem is used in one embodiment of the present invention to handle the additional complexity created by out-of-order processing of data by the texture unit, ALU, and control logic. In one embodiment, registers 900 within the unified shader are quad or double buffered. Global commands allow the immediate copying of an entire register set. Typically, those registers expected to change often are quad-buffered. Those registers expected to change infrequently are double-buffered.

In another embodiment, a plurality of unified shaders are connected together to process shading operations in parallel. These unified shaders are connected with minimal gluing logics and are synchronized by a universal clock to ensure proper processing.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention relates to a unified shader. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Unified Shader

Figure 1:
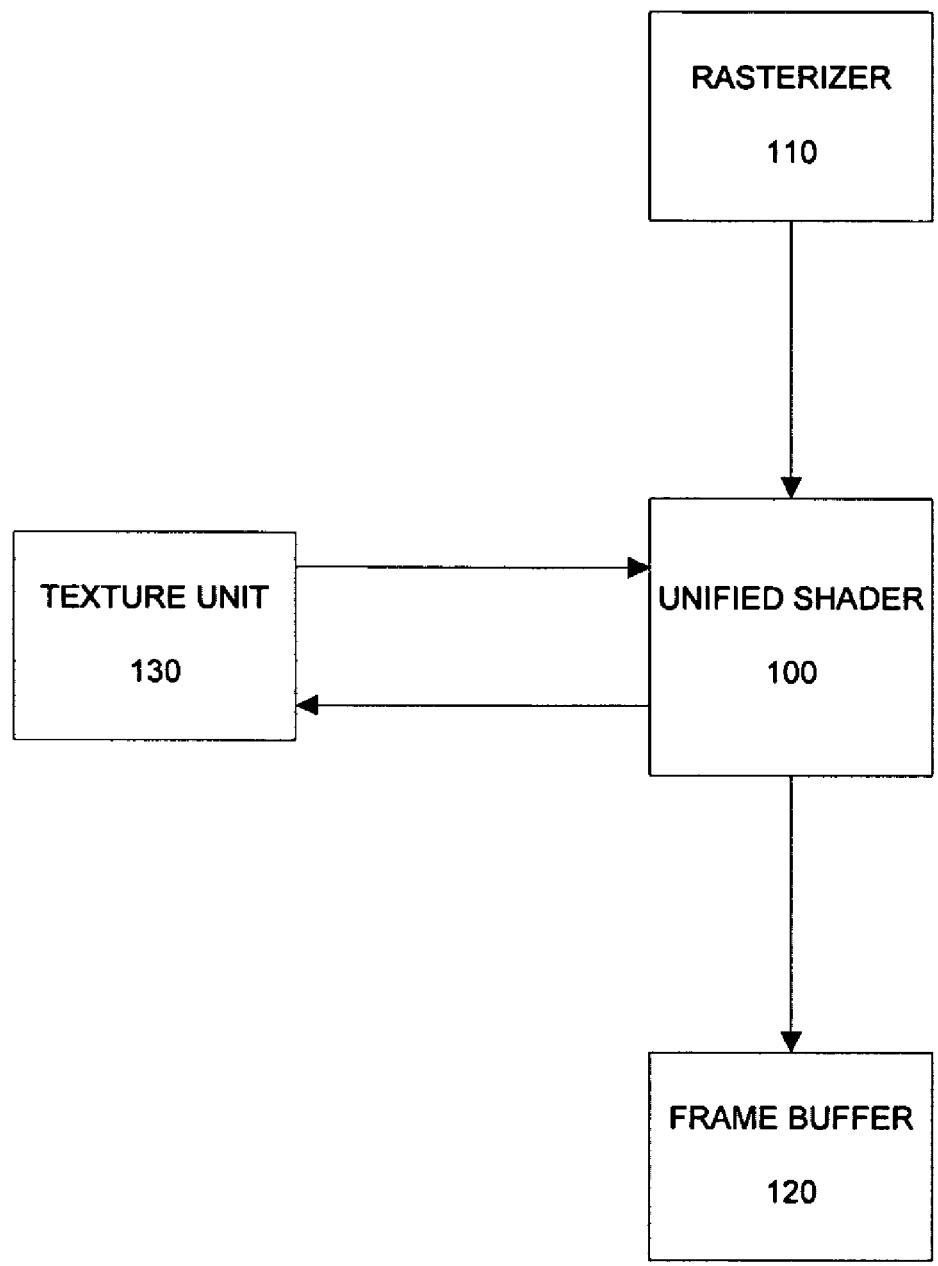
FIG. 1 is a block diagram of a unified shader according to an embodiment of the present invention.

One embodiment of a unified shader is shown in the block diagram of FIG. 1. Unified shader 100 performs per-pixel shading calculations on rasterized values that are passed from a rasterizer unit 110. The results of the calculations are sent to frame buffer 120. As part of the calculation performed by unified shader 100, a texture unit 130 may receive texture lookup requests from the shader 100. The actual shading algorithm used may vary and may be defined by a set of instructions, such as microcode instructions.

Unified (Pixel) Shader Architecture

Figure 2:
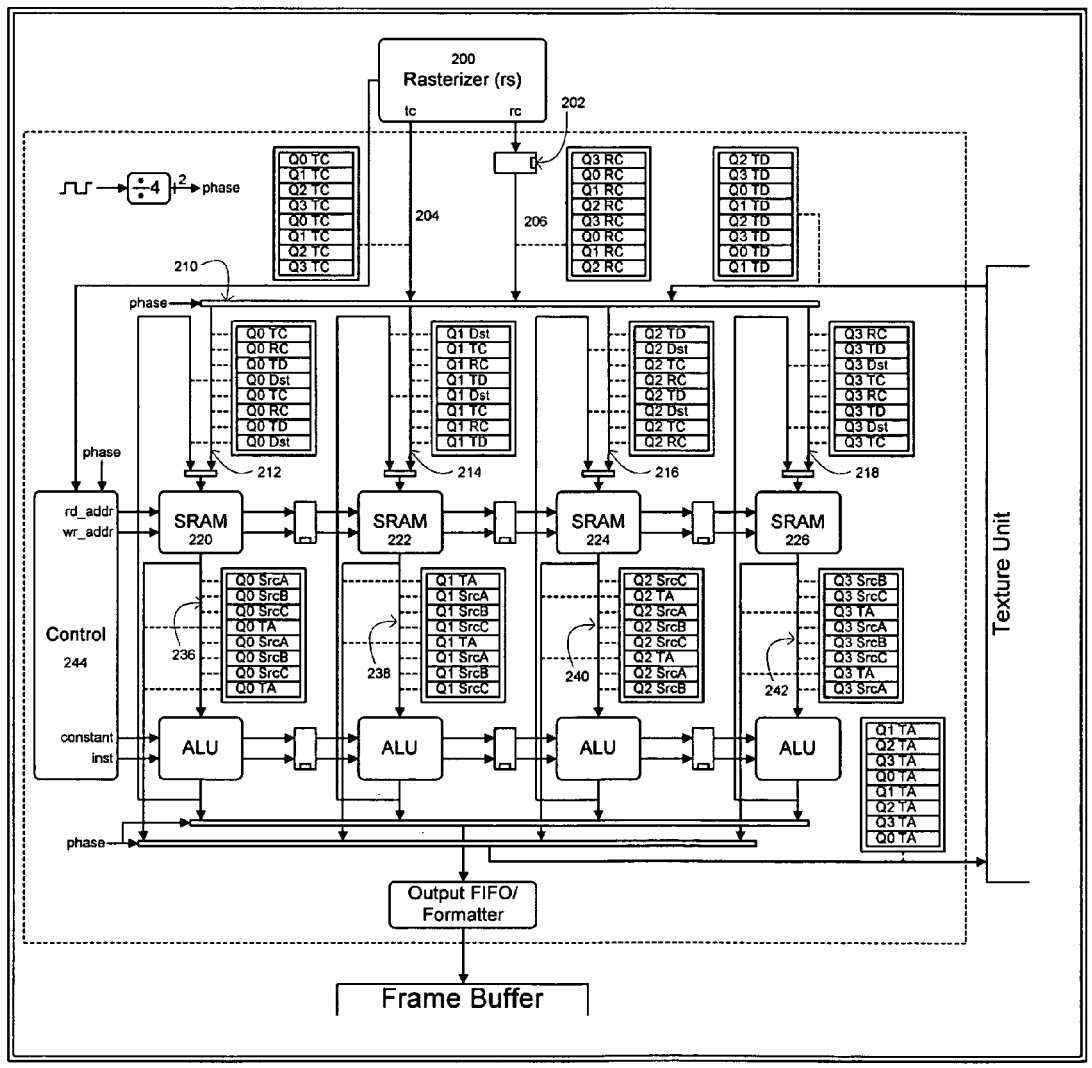
FIG. 2 shows a unified shader architecture according to an embodiment of the present invention.

FIG. 2 is a block diagram of a Unified Shader according to an embodiment of the present invention. The rasterizer 200 generates a texture address (tc) and rasterization color (rc) in any suitable format and order at a rate of one pixel quad (a quad is a 2×2 tile of pixels) every clock. The rasterization color is delayed by one clock at delay 202 to provide correct interleaving for the rest of the design. Buses 204 and 206 then pass the packet through a 4-way crossbar 210 programmed to rotate one slot each clock over a 4-clock cycle. The result is that output 0 (212) of the crossbar (210) contains exclusively Quad 0 data, output 1 (214) contains Quad 1 data, output 2 (216) contains Quad 2 data, and output 3 (218) contains Quad 3 data.

Four identical SRAM/ALU pairs 220, 222, 224, and 226 process the data. SRAM space is allocated as each quad is received from the rasterizer. This space is used to store input values and intermediate variables needed by the shader program. This space remains allocated for the time it takes to completely process the quad. Sufficient storage is available such that multiple quads can reside in the shader at the same time at different stages of completion. Though SRAM is used in one embodiment, it can be appreciated that other types of equivalent physical memory implementation can be used as well.

Each SRAM/ALU performs the following operations in one 4-clock cycle:

1. Writes one rasterizer texture address to the SRAM.
2. Writes one rasterizer color value to the SRAM.
3. Reads up to three source operands from the SRAM and executes one shader instruction.
4. Writes the result from the ($2^{nd}$ previous) shader instruction back to the SRAM.
5. Reads one texture address from the SRAM and issues it to the texture unit.
6. Writes one return texture value to the SRAM.

Due to the time skewing of each SRAM/ALU paid relative to the previous one, it is possible to use a simple mux to multiplex the texture requests from the four SRAM/ALU pairs into a single stream containing one texture request every clock. The resulting texture data is de-multiplexed and written back into the SRAM's. A control logic block 244 generates the SRAM read and write addresses, and issues the ALU instructions for the first SRAM and ALU 220. Each successive SRAM and ALU receives the same addresses and instruction delayed by one clock from the previous one. This enables the addresses and instructions to be lined up with the time-skewed data.

Each SRAM operates within a 4-clock cycle, allowing a single read/write physical SRAM to support four reads and four writes during a given cycle. This design traditionally would have required multi-ported RAM's or register files. The use for each read and write slot within the 4-clock cycle is defined in table 1.

TABLE 1

| write_data[ ] | read_data[ ] |
| --- | --- |
| Clock 0 Rasterized Texture Address (tc) | ALU Source Operand A |
| Clock 1 Rasterized Color (rc) | ALU Source Operand B |
| Clock 2 Texture Unit Data (td) | ALU Source Operand C |
| Clock 3 ALU Destination | Texture Unit Address (ta) |

Shader Code Partitioning

The first step in programming the unified shader of the present invention is partitioning the shader code. This ensures that all ALU and texture instructions pertaining to a given level of indirection are grouped together. The reason for this is that texture operations within the same level are effectively executed in parallel, and so it is important that there be no cross-dependencies.

In one embodiment, indirection levels are numbered starting with 0 at the top of the code, and increasing by 1 for each pass through the texture system. An indirection level of 0 means that all ALU operands or texture addresses are derived directly from the input data (rasterized color and texture addresses). An indirection level of 1 means that all ALU operands or texture addresses are dependent on the result from a single pass through the texture system. An indirection level of 2 means that all ALU operands or texture addresses are dependent on the result from two passes through the texture system.

Figure 3:
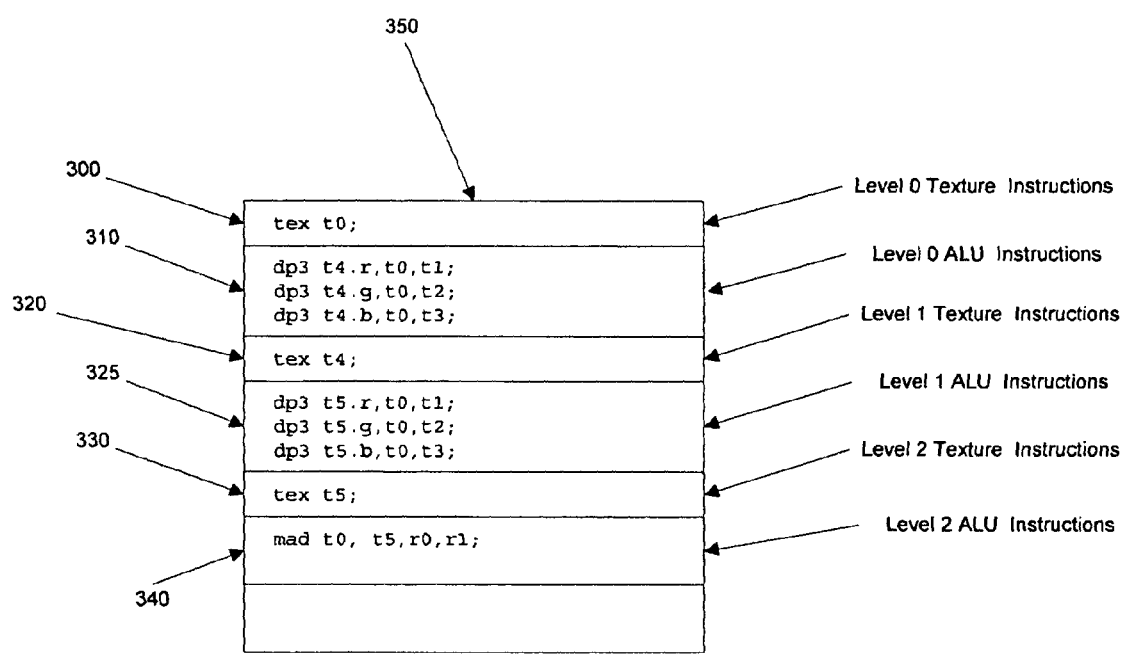
FIG. 3 shows how shader code is partitioned according to an embodiment of the present invention.

FIG. 3 shows an example shader code, together with its corresponding partitioning. Shader code 350 includes code for level 0 texture instructions 300, level 0 ALU instructions 310, level 1 texture instructions 320, level 1 ALU instructions 325, level 2 texture instructions 330, and level 2 ALU instructions 340.

Control Logic

Figure 4:
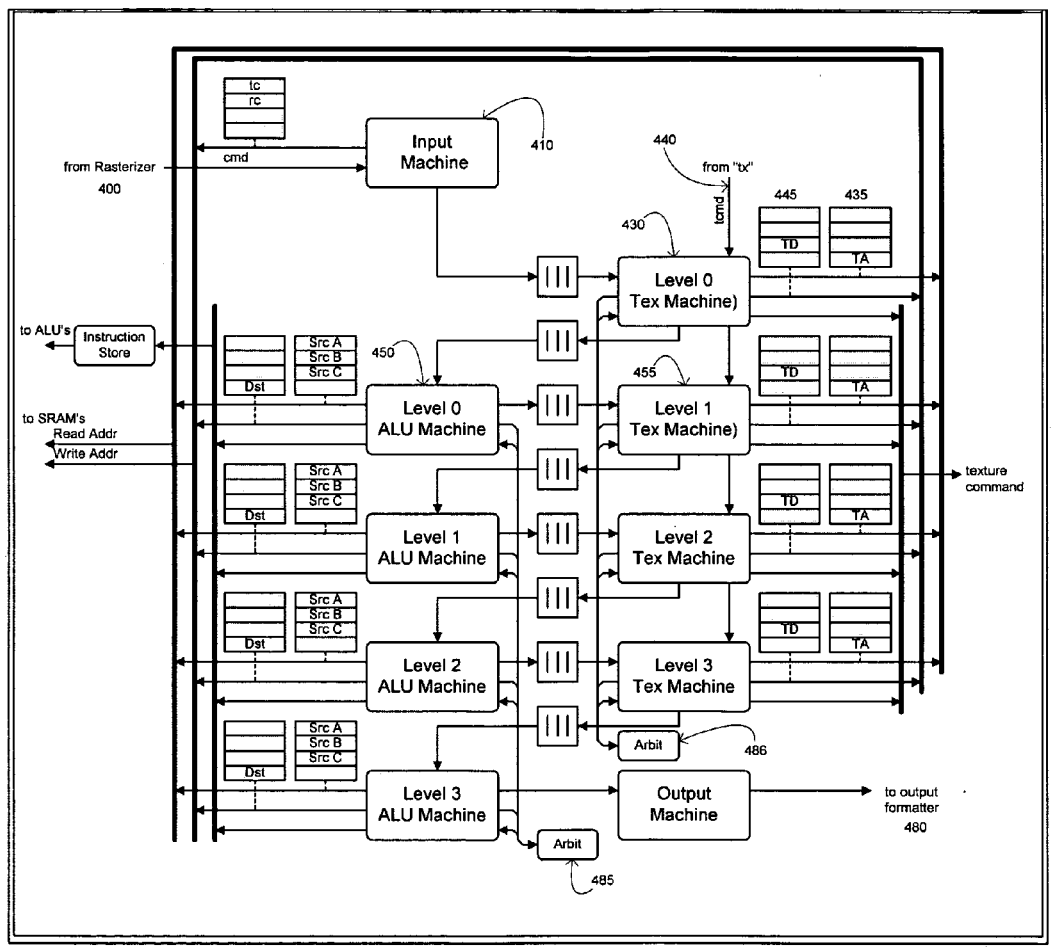
FIG. 4 shows how control logic is used according to an embodiment of the present invention.

The control logic for the Unified Pixel Shader of one embodiment of the present invention comprises a number of state machines connected serially by a set of small FIFO's. As data for each block of pixels is received from the rasterizer, a "control token" is generated. The control token contains a small amount of information describing this block of pixels. The control token is passed serially between state machines to indicate who has control over this block of data. Once the control token has reached the last state machine in the chain and the final processed data has been output, the control token is discarded. For a 4-level system, 10 state machines are required. This embodiment's control logic is shown in FIG. 4.

Rasterizer 400 generates packets of data containing information for a block of 16 pixels (4 quads). Each pixel contains one or more sets of texture coordinates (texture addresses), and one or more color values. The time needed to transfer this packet is dependent on the number of texture coordinates and colors.

The input state machine 410 receives notification that a packet of data is being received. The input state machine then allocates storage space (for storing input and temporary values) for the block of 16 pixels—each of the four SRAM's will own 4 pixels. The input state machine then instructs the SRAMS's to write the (one or more) sets of texture coordinates and color data to the correct locations within this recently allocated storage space. Upon completion, the input state machine generates a control token for this block of data, and passes it to the level 0 Texture machine 430.

The level 0 texture machine 430 implements the level 0 Texture sequence as shown in FIG. 3 (300). Upon receipt of a control token, this state machine executes each instruction in the sequence, applying the operation to all 16 pixels within the block associated with this control token. For each instruction in this sequence, the level 0 Texture machine instructs the SRAM's to read a set of texture coordinates, and then issues commands to the texture unit to perform a lookup on these texture coordinates. As data is returned from the texture unit, it gets written into the SRAM's at the appropriate location. Upon receipt of the return data for the last instruction in the level 0 texture sequence, the level 0 texture machine passes the control token to the level 0 ALU machine 450.

The level 0 ALU machine 450 implements the level 0 ALU sequence as shown in FIG. 3 (310). Upon receipt of a control token, this state machine executes each instruction in the sequence, applying the operation to all 16 pixels within the block associated with this control token. For each instruction in this sequence, the level 0 ALU machine instructs the SRAM's to read the source data for this instruction, then instructs the ALU to perform the appropriate operation on the data (ADD, MUL, etc.), and then instructs the SRAM's to write the result. Upon completion of the level 0 ALU sequence, the level 0 ALU machine passes the control token to the level 1 texture machine 455.

The level 1 texture machine 455 operates in the same way as the level 0 texture machine 430, passing the control token to the level 1 ALU machine on completion of its section of code. Thus the control token propagates through all 10 machines. Eventually, the command reaches the output state machine. The output state machine instructs the output formatter to pull data from the output FIFO, which is then reformatted and sent out of the Unified Shader to the frame buffer. Following this, the control token is discarded and the storage space for the block of data is deallocated.

Only one ALU state machine may have access to the SRAM address bus or the instruction decode bus at one time. Similarly, only one texture state machine may have access to the SRAM address bus at one time. Arbitration is performed by two arbiter blocks 485 and 486 (one for the ALU state machines and one for the Texture state machines). The arbiters always favor the higher level state machine, preventing half-finished jobs from clogging up the SRAM's.

Different controls token may be resident in the different parts of the control pipelines at the same time, providing an efficient way of hiding latency through the texture unit and maximizing usage of the ALU and the texture units. As an example, the texture unit may be working on a given block while at the same time the ALU may be working on an earlier block.

A comparison of the allocation address pointer for the input state machine, and the deallocation pointer in the output state machine in the chain, gives an indication of how much unallocated SRAM memory is available. When this number falls below a preset mark, the input state machine will stall the rasterizer preventing any new input data.

Where the number of levels of indirection is less than four, certain state machines will go into "pass_through" mode where they immediately copy the control token from the input to the output without performing any work or waiting for arbitration.

Register Subsystem

Figure 5:
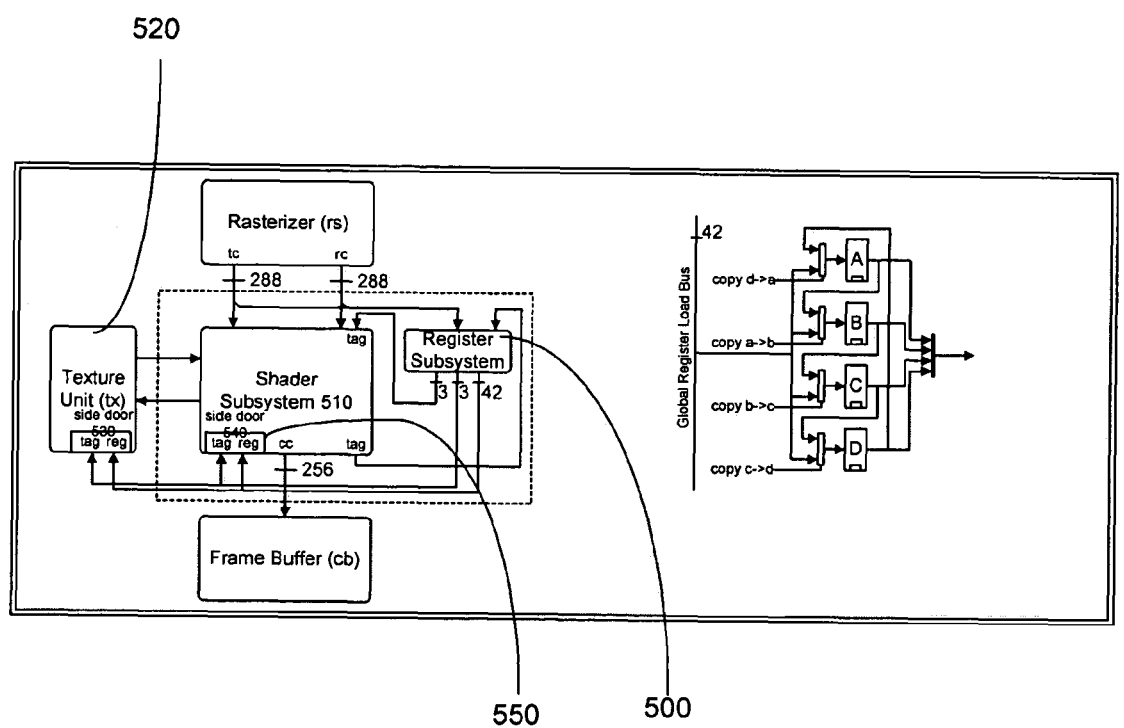
FIG. 5 shows a register subsystem according to an embodiment of the present invention.

Due to the out-of-order processing of data by the texture unit, ALU, and control logic, the normal trickle-down method of loading registers will not work without a complex system of partial flushes that will seriously compromise performance. For this reason, a new register subsystem is used in one embodiment of the present invention and is shown in FIG. 5. All registers 500 within the unified shader subsystem 510 (including those owned by the texture system 520) are quad or double buffered. The quad-buffered register sets are labeled "A", "B", "C", and "D". The double-buffered register sets are labeled "E", and "F". Register loading happens through side doors 530 and 540 and takes effect immediately. A tag 550 attached to the data within the shader specifies which register set to use. Global commands allow the immediate copying of an entire register set. Typically, those registers expected to change often (such as PP_TXFILTER0) are quad-buffered. Those registers expected to change infrequently (such as PP_TXFILTER1) are double-buffered.

On reset, the default quad-buffering tag is set to "A" and the default double-buffered tag is set to "E". The default tag specifies where mode change registers are written, as well as how subsequent pixel quads are tagged. At the start of the second mode change, a global command is issued to copy register sets "A" to "B" and the default quad-buffered tag is switched to "B". If the mode change affects double buffered registers, an additional global command is issued to copy register sets "E" to "F" and the default double buffered-tag is switched to F. This continues in rotation with successive mode changes and pixel quads using register sets "C", "D", "A", "B", etc. for quad buffered registers, and "E", "F", "E", "F", etc. for double buffered registers.

Prior to issuing a copy command, a check is made of the tag attached to the last pixel quad to leave the shader. If this is equal to the destination register set specified in the copy command, the pipeline is stalled until the situation is rectified. As an example, to copy register set "C" to "D", one must first look at the data leaving the shader. If this is tagged to use register set "C", one knows that it cannot be removed from register set "C" without causing an error. Once the tag associated with the data leaving the shader changes to "D", one can then safely remove the data in "C", and resume operation.

Multiple Shaders

Figure 6:
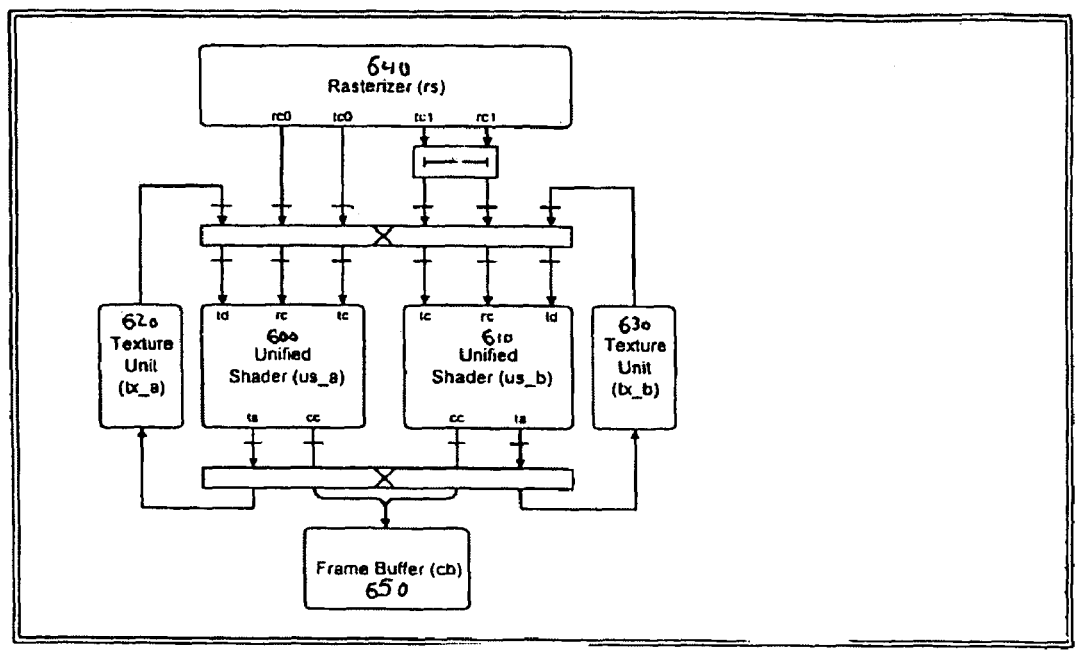
FIG. 6 shows a multiple shader system according to an embodiment of the present invention.

Multiple unified shaders may be connected (along with a minimum amount of routing and glue logic), to support multiple ALU operations per pixel per clock and multiple independent texture lookups per clock. One embodiment using multiple shaders is shown in FIG. 6. In this embodiment two unified shaders 600 and 610 support two ALU operations per pixel per clock and two independent texture lookups per clock using texture units 620 and 630.

Such a system may be partially disabled (under software control), to allow a fall back to 1 ALU operation per pixel per clock, and 1 texture unit. In the case where the system is partially disabled, the user may choose which of the two unified shaders and which of the two texture units to disable. The system of FIG. 6 operates on an 8-clock cycle made up from two 4-clock cycles labeled "a" and "b". Each shader 600 and 610 operates on a 4-clock cycle, however it can be programmed to issue requests for odd textures during one cycle type ("a" or "b") and even textures during the other cycle type.

The rasterizer 640 outputs two texture addresses and two colors per pixel per clock. Eight quads are rasterized together, with the rasterizer outputting the first set of texture address and color for all eight quads before moving on to the next set. During the "a" cycle, four sets of even texture addresses and colors are passed from the rasterizer to Unified Shader 600 (us_a). During the "b" cycle, the crossbar 650 between the rasterizer and shaders is configured to "swap", and the next four sets of even texture addresses and colors are passed to unified shader 610 (us_b). Simultaneously, the first four sets of odd texture addresses and colors are passed to unified shader 600 (us_a) after having been delayed by 4 clocks. Thus "us_a" ends up operating on quads 0-3, 8-11, 16-19, etc. and "us_b" ends up operating on quads 4-7, 12-15, 20-23, etc.

When a request for texture owned by the "tx_a" texture unit 620 is called for, this is issued by "us_a" during the "a" cycle for the first set of 4 quads, and by "us_b" during the "b" cycle for the second set of 4 quads. Similarly, when a request for a texture owned by the "tx_b" texture unit 630 is called for, this is issued by "us_a" during the "b" cycle for the first set of quads, and by "us_b" during the "a" cycle for the second set of quads. Since each crossbar is programmed to swap only during the "b" cycle, this ensures that texture units "tx_a" and "tx_b" only process requests for textures which they own. The assignment of textures to the "tx_a" and "tx_b" texture units is done at compile time.

Since shader "us_b" always operates exactly four clocks later than "us_a", the output data starts coming out of "us_a" for 4 clocks followed by "us_b" for 4 clocks. The outputs are "or'd" together to get a continuous "in order" output stream going to the frame buffer 650. The only modification to the unified shader architecture needed to support an 8-ALU, 2-texture system, is the ability to conditionally issue and receive texture requests during a specific cycle. This requires a small amount of additional complexity to the texture state machine in the control logic. Reverting back to a 4-ALU, 1-texture system involves (a) reconfiguring the crossbars, (b) turning off the conditional texture feature in the unified shaders, and (c) reconfiguring the rasterizer to generate all texture addresses and colors from the tc0 and rc0 ports over a 4-quad cycle.

ALU I/O Description

Figure 7:
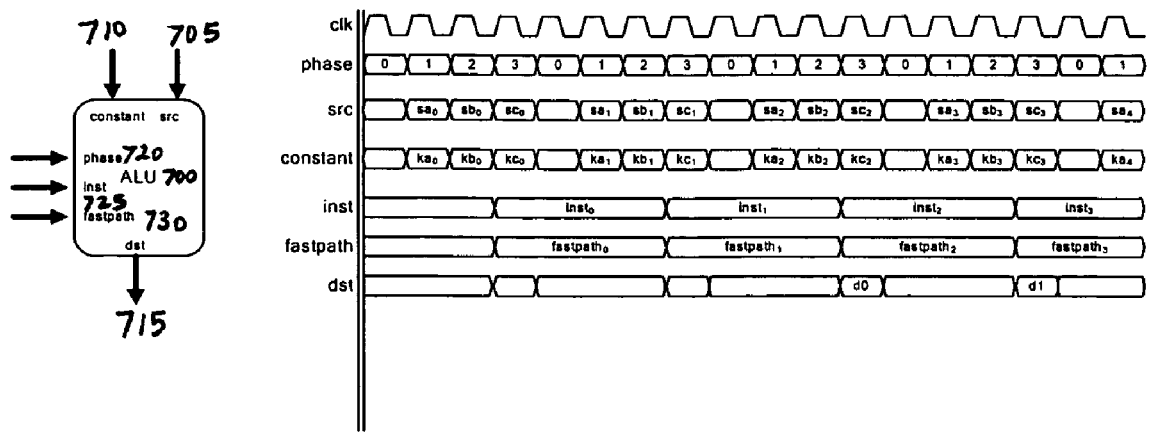
FIG. 7 shows an ALU according to an embodiment of the present invention.

Each ALU processes one pixel quad (4 pixels) each 4-clock cycle. An example of one embodiment of an ALU is shown in FIG. 7. Data is passed to the ALU 700 over an input bus (src) 705 and a constant bus (constant) 710. Data is passed out of the ALU over a single output bus (dst) 715. Three additional buses, phase 720, inst 725, and fastpath 730 control the operation of the ALU. No flow control is needed for this ALU, and there is no mechanism for stalling the data. Once a pixel quad has been submitted, the receiver is guaranteed to be able to accept the result after the designated number of clocks.

Even though the result from the ALU operation appears 10 clocks after the instruction is issued, internally the ALU must have a 4-clock latency. The cases where one or more of the source operands are equal to result from the previous of $2^{nd}$ previous ALU operation, are handled internally by a fast path, and are controlled by the "fastpath" instruction.

Embodiment of Computer Execution Environment (Hardware)

Figure 8:
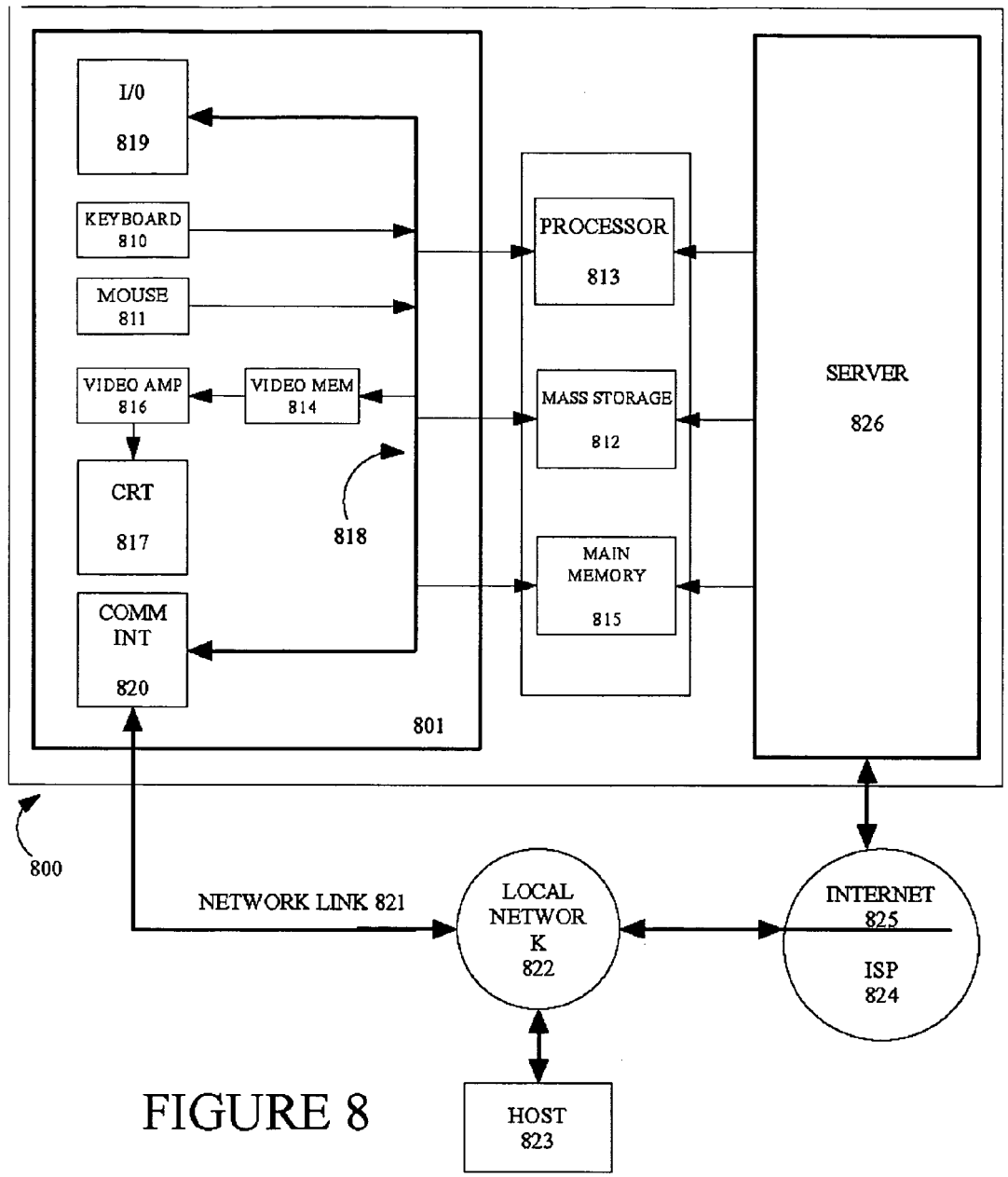
FIG. 8 is an embodiment of a computer execution environment suitable for the present invention.

An embodiment of the invention can be implemented as computer software in the form of computer readable program code executed in a general purpose computing environment such as environment 800 illustrated in FIG. 8, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 810 and mouse 811 are coupled to a system bus 818. The keyboard and mouse are for introducing user input to the computer system and communicating that user input to central processing unit (CPU) 813. Other suitable input devices may be used in addition to, or in place of, the mouse 811 and keyboard 810. I/O (input/output) unit 819 coupled to bi-directional system bus 818 represents such I/O elements as a printer, A/V (audio/video) I/O, etc.

Computer 801 may include a communication interface 820 coupled to bus 818. Communication interface 820 provides a two-way data communication coupling via a network link 821 to a local network 822. For example, if communication interface 820 is an integrated services digital network (ISDN) card or a modem, communication interface 820 provides a data communication connection to the corresponding type of telephone line, which comprises part of network link 821. If communication interface 820 is a local area network (LAN) card, communication interface 820 provides a data communication connection via network link 821 to a compatible LAN. Wireless links are also possible. In any such implementation, communication interface 820 sends and receives electrical, electromagnetic or optical signals which carry digital data streams representing various types of information.

Network link 821 typically provides data communication through one or more networks to other data devices. For example, network link 821 may provide a connection through local network 822 to host 823 or to data equipment operated by ISP 824. ISP 824 in turn provides data communication services through the world wide packet data communication network now commonly referred to as the "Internet" 825. Local network 822 and Internet 825 may use electrical, electromagnetic or optical signals which carry digital data streams. The signals through the various networks and the signals on network link 821 and through communication interface 820, which carry the digital data to and from computer 800, are exemplary forms of carrier waves transporting the information.

Processor 813 may reside wholly on client computer 801 or wholly on server 826 or processor 813 may have its computational power distributed between computer 801 and server 826. Server 826 symbolically is represented in FIG. 8 as one unit, but server 826 can also be distributed between multiple "tiers". In one embodiment, server 826 comprises a middle and back tier where application logic executes in the middle tier and persistent data is obtained in the back tier. In the case where processor 813 resides wholly on server 826, the results of the computations performed by processor 813 are transmitted to computer 801 via Internet 825, Internet Service Provider (ISP) 824, local network 822 and communication interface 820. In this way, computer 801 is able to display the results of the computation to a user in the form of output.

Computer 801 includes a video memory 814, main memory 815 and mass storage 812, all coupled to bi-directional system bus 818 along with keyboard 810, mouse 811 and processor 813. As with processor 813, in various computing environments, main memory 815 and mass storage 812, can reside wholly on server 826 or computer 801, or they may be distributed between the two. Examples of systems where processor 813, main memory 815, and mass storage 812 are distributed between computer 801 and server 826 include the thin-client computing architecture developed by Sun Microsystems, Inc., the palm pilot computing device and other personal digital assistants, Internet ready cellular phones and other Internet computing devices, and in platform independent computing environments, such as those that utilize the Java technologies also developed by Sun Microsystems, Inc.

The mass storage 812 may include both fixed and removable media, such as magnetic, optical or magnetic optical storage systems or any other available mass storage technology. Bus 818 may contain, for example, thirty-two address lines for addressing video memory 814 or main memory 815. The system bus 818 may also include, for example, a 32-bit data bus for transferring data between and among the components, such as processor 813, main memory 815, video memory 814 and mass storage 812. Alternatively, multiplex data/address lines may be used instead of separate data and address lines.

In one embodiment of the invention, the processor 813 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 815 may be comprised of dynamic random access memory (DRAM). Video memory 814 may be a dual-ported video random access memory. One port of the video memory 814 may be coupled to video amplifier 816. The video amplifier 816 may be used to drive a display/output device 817, such as a cathode ray tube (CRT) raster monitor. Video amplifier 816 is well known in the art and may be implemented by any suitable apparatus. This circuitry converts pixel data stored in video memory 814 to a raster signal suitable for use by display/output device 817. Display/output device 817 may be any type of monitor suitable for displaying graphic images.

Computer 801 can send messages and receive data, including program code, through the network(s), network link 821, and communication interface 820. In the Internet example, remote server computer 826 might transmit a requested code for an application program through Internet 825, ISP 824, local network 822 and communication interface 820. The received code may be executed by processor 813 as it is received, and/or stored in mass storage 812, or other non-volatile storage for later execution. In this manner, computer 800 may obtain application code in the form of a carrier wave. Alternatively, remote server computer 826 may execute applications using processor 813, and utilize mass storage 812, and/or video memory 815. The results of the execution at server 826 are then transmitted through Internet 825, ISP 824, local network 822 and communication interface 820. In this example, computer 801 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for example only. An embodiment of the invention may be implemented in any type of computer system or programming or processing environment.

Thus, a unified shader is described in conjunction with one or more specific embodiments. The invention is defined by the claims and their full scope of equivalents.

We claim:

1. A unified shader comprising:
an input interface for receiving a packet from a rasterizer;
a shading processing mechanism configured to produce a resultant value from said packet by performing one or more shading operations, wherein said shading operations comprise both texture operations and color operations and comprising at least one ALU/memory pair operative to perform both texture operations and color operations wherein texture operations comprise at least one of: issuing a texture request to a texture unit and writing received texture values to the memory and wherein the at least one ALU is operative to read from and write to the memory to perform both texture and color operations; and
an output interface configured to send said resultant value to a frame buffer.

2. The shader of claim 1 wherein said input interface receives said packet from said rasterizer using a valid-ready protocol.

3. The shader of claim 1 wherein said output interface sends said value to said frame buffer using a valid-ready protocol.

4. The shader of claim 1 further comprising: a code partition mechanism to partition code configured to instruct said shading mechanism.

5. The unified shader of claim 4 wherein said partitioning mechanism groups code together by level of indirection.

6. The unified shader of claim 5 further comprises control logic to process said partitioned code, wherein said control logic comprises:
an input state machine;
a plurality of ALU state machines; and
a plurality of texture machines.

7. The unified shader of claim 1 further comprises: a register sub-system.

8. The unified shader of claim 1 wherein said shading mechanism further comprises:
a plurality of ALU/memory pairs to perform said shading operations.

9. The unified shader of claim 8 wherein said plurality of ALU/memory pairs
constitute a single coherent memory structure, wherein said plurality of ALU/memory are synchronized by a scheduling clock mechanism.

10. The unified shader of claim 9 wherein said plurality of ALU/memory pairs constitute a pipeline for processing said shading operations.

11. The unified shader of claim 9 wherein said wherein said memory structure is a FIFO that does not have an associated buffer.

12. The unified shader of claim 11 wherein said FIFO comprises both data and operation instructions.

13. The unified shader of claim 1 wherein the memory of the at least one ALU/memory pair is controlled to store input values and intermediate variables needed by the shading processing mechanism and is allocated for a time it takes to process quad data and wherein the ALU of the ALU/memory pair writes a texture address to memory, writes a color value to the memory, reads a plurality of source operands from the memory and executes a shader instruction, writes a result from a previous shader instruction back to memory, reads a texture address from memory and issues it to a texture unit and writes a return texture value to the memory.

14. A method for shading comprising:
receiving a packet from a rasterizer;
obtaining a value by performing one or more shading operations using a plurality of ALU/memory pairs, wherein said shading operations comprise both texture operations and color operations and wherein each of the ALU/memory pairs performs both texture and color operations wherein texture operations comprise issuing a texture request to a texture unit and writing received texture values to the memory and wherein each of the ALUs in the ALU/memory pairs are operative to read from and write to respective memories to perform both texture and color operations; and
sending said value to a frame buffer.

15. The method of claim 14 wherein said receiving uses a valid-ready protocol.

16. The method of claim 14 wherein said sending uses a valid-ready protocol.

17. The method of claim 14 wherein said obtaining comprises: partitioning a code configured to instruct a unified shader.

18. The method of claim 17 wherein said partitioning groups code together by level of indirection.

19. The method of claim 17 wherein said obtaining further comprises using control logic to process said partitioned code, wherein said control logic comprises:
an input state machine;
a plurality of ALU state machines; and
a plurality of texture machines.

20. The method of claim 14 wherein said obtaining further comprises using a register sub-system.

21. The method of claim 14 wherein said obtaining comprises: using a plurality of ALU/memory pairs to perform said shading operations.

22. The method of claim 21 wherein said plurality of ALU/memory pairs constitute a single coherent memory structure, wherein said plurality of ALU/memory pairs are synchronized by a scheduling clock mechanism.

23. The method of claim 22 wherein said plurality of ALU/memory pairs constitute a pipeline for processing said shading operations.

24. The method of claim 22 wherein said memory structure is a FIFO that does not have an associated buffer.

25. The method of claim 24 wherein said FIFO comprises both data and operation instructions.

26. The method of claim 14 wherein said obtaining comprises: using a plurality of connected unified shaders, wherein said unified shaders are synchronized by a clock mechanism to process said shading operations together.

27. A computer program product comprising:
a physical computer usable storage medium having computer readable program code stored therein configured to shade, said computer program product comprising:
computer readable code configured to cause a computer to receive a packet from a rasterizer;
computer readable code configured to cause a computer to obtain a value by performing one or more shading operations using a plurality of ALU/memory pairs, wherein said shading operations comprise both texture operations and color operations and wherein each of the ALU/memory pairs performs both texture and color operations wherein texture operations comprise issuing a texture request to a texture unit and writing received texture values to the memory and wherein each of the ALUs in the ALU/memory pairs are operative to read from and write to respective memories to perform both texture and color operations; and
computer readable code configured to cause a computer to send said value to a frame buffer.

28. The computer program product of claim 27 wherein said computer readable code configured to cause a computer to receive uses a valid-ready protocol.

29. The computer program product of claim 27 wherein said computer readable code configured to cause a computer to send uses a valid-ready protocol.

30. The computer program product of claim 27 wherein said computer readable code configured to cause a computer to obtain comprises:
computer readable code configured to cause a computer to partition a code configured to instruct a unified shader.

31. The computer program product of claim 30 wherein said computer readable code configured to cause a computer to partition groups code together by level of indirection.

32. The computer program product of claim 31 wherein said computer readable code configured to cause a computer to obtain further comprises computer readable code configured to cause a computer to use a control logic to process said partitioned code, wherein said control logic comprises:
an input state machine
a plurality of ALU state machines; and
a plurality of texture machines.

33. The computer program product of claim 32 wherein said computer readable code configured to cause a computer to obtain further comprises computer readable code configured to cause a computer to use a register sub-system.

34. The computer program product of claim 27 wherein said computer readable code configured to cause a computer to obtain comprises:
computer readable code configured to cause a computer to use a plurality of ALU/memory pairs to perform said shading operations.

35. The computer program product of claim 34 wherein said plurality of ALU/memory pairs constitute a single coherent memory structure, wherein said plurality of ALU/memory pairs are synchronized by a scheduling clock mechanism.

36. The computer program product of claim 35 wherein said plurality of ALU/memory pairs constitute a pipeline for processing said shading operations.

37. The computer program product of claim 35 wherein said memory structure is a FIFO that does not have an associated buffer.

38. The computer program product of claim 37 wherein said FIFO comprises both data and operation instructions.

39. The computer program product of claim 27 wherein said computer readable code configured to cause a computer to obtain comprises:
compute readable code configured to cause a computer to use multiple unified shaders wherein said unified shaders are connected.

40. A device comprising:
a plurality of unified shaders synchronized by a clock mechanism to process shading operations together, wherein each of the unified shaders comprises:
an input interface for receiving a packet from a rasterizer;
a shading processing mechanism configured to produce a resultant value from said packet by performing one or more shading operations, wherein said shading operations comprise both texture operations and color operations and comprising at least one ALU/memory pair operative to perform both texture operations and color operations wherein texture operations comprise issuing a texture request to a texture unit and writing received texture values to the memory and wherein the at least one ALU is operative to read from and write to the memory to perform both texture and color operations; and
an output interface configured to send said value to a frame buffer.

41. A unified shader comprising:
an input interface for receiving a packet from a rasterizer;
a shading processing mechanism configured to produce a resultant value from said packet by performing one or more shading operations, wherein said shading operations comprise both texture operations and color operations;
an output interface configured to send said value to a frame buffer;
a code partition mechanism to partition code configured to instruct said shading mechanism wherein said partitioning mechanism groups code together by level of indirection; and
control logic to process said partitioned code, wherein said control logic comprises:

an input state machine;
a plurality of ALU state machines; and
a plurality of texture machines.

42. A method for shading comprising:
receiving a packet from a rasterizer;
obtaining a value by performing one or more shading operations, wherein said shading operations comprise both texture operations and color operations;
sending said value to a frame buffer;
wherein said obtaining comprises: partitioning a code configured to instruct a unified shader;
wherein said obtaining further comprises uses a control logic to process said partitioned code and wherein said control logic comprises:
an input state machine;
a plurality of ALU state machines; and
a plurality of texture machines.

43. A computer program product comprising:
a computer usable physical medium, not including carrier waves, having computer readable executable program code embodied therein configured to shade, said computer program product comprising:
computer readable code configured to cause a computer to receive a packet from a rasterizer;
computer readable code configured to cause a computer to obtain a value by performing one or more shading operations, wherein said shading operations comprise both texture operations and color operations;
computer readable code configured to cause a computer to send said value to a frame buffer;
wherein said computer readable code configured to cause a computer to obtain comprises:
computer readable code configured to cause a computer to partition a code configured to instruct a unified shader;
wherein said computer readable code configured to cause a computer to partition groups code together by level of indirection;
wherein said computer readable code configured to cause a computer to obtain further comprises computer readable code configured to cause a computer to use a control logic to process said partitioned code, wherein said control logic comprises:
an input state machine
a plurality of ALU state machines; and
a plurality of texture machines.

* * * * *